United States Patent
Dragic et al.

(10) Patent No.: US 11,880,062 B2
(45) Date of Patent: Jan. 23, 2024

(54) MICROHEATER COMPRISING A RARE EARTH-DOPED OPTICAL FIBER

(71) Applicants: The Board of Trustees of the University of Illinois, Urbana, IL (US); Clemson University, Clemson, SC (US)

(72) Inventors: Peter Dragic, Champaign, IL (US); John Ballato, Clemson, SC (US); Andrey Mironov, Urbana, IL (US); Courtney Kucera, Anderson, SC (US); Matthew Tuggle, Charleston, SC (US)

(73) Assignees: THE BOARD OF TRUSTEES OF THE UNIVERSITY OF ILLINOIS, Urbana, IL (US); CLEMSON UNIVERSITY, Clemson, SC (US)

( * ) Notice: Subject to any disclaimer, the term of this patent is extended or adjusted under 35 U.S.C. 154(b) by 271 days.

(21) Appl. No.: 16/689,349

(22) Filed: Nov. 20, 2019

(65) Prior Publication Data
US 2020/0174184 A1    Jun. 4, 2020

Related U.S. Application Data

(60) Provisional application No. 62/789,608, filed on Jan. 8, 2019, provisional application No. 62/773,701, filed on Nov. 30, 2018.

(51) Int. Cl.
*G02B 6/02* (2006.01)
*G02F 1/295* (2006.01)
(Continued)

(52) U.S. Cl.
CPC .......... *G02B 6/02114* (2013.01); *C03C 25/62* (2013.01); *G02B 2006/1208* (2013.01)

(58) Field of Classification Search
CPC ........ G02B 6/02114; G02B 2006/1208; C03C 25/62; C03C 13/04; C03B 37/027; C03B 37/026; C03B 37/01211; C03B 2201/36; C03B 2201/62; C03B 2201/70; C03B 2201/78; C03B 2201/40; C03B 2201/42; C03B 2201/075; C03B 2201/34
(Continued)

(56) References Cited

U.S. PATENT DOCUMENTS

| | | | | |
|---|---|---|---|---|
| 5,485,480 A | * | 1/1996 | Kleinerman | G01J 5/08 372/39 |
| 6,611,372 B1 | * | 8/2003 | Peyghambarian | H01S 3/067 359/341.1 |

(Continued)

OTHER PUBLICATIONS

Alvarez-Chavez et al., "High-energy, high-power ytterbium-doped Q-switched fiber laser," *Optics Letters*, 25, 1 (2000) pp. 37-39.
(Continued)

*Primary Examiner* — Kaveh C Kianni
*Assistant Examiner* — Hung Q Lam
(74) *Attorney, Agent, or Firm* — Crowell & Moring LLP

(57) ABSTRACT

A microheater comprises an optical fiber including a rare earth-doped glass core surrounded by a glass cladding. The rare earth-doped glass core comprises a rare earth dopant at a concentration sufficient for luminescence quenching such that, when the rare earth dopant is pumped with light at an absorption band wavelength, at least about 90% of absorbed pump light is converted into heat.

18 Claims, 4 Drawing Sheets

(51) Int. Cl.
*G02B 6/12* (2006.01)
*G02B 6/26* (2006.01)
*G02B 6/42* (2006.01)
*G02B 6/10* (2006.01)
*C03C 25/62* (2018.01)

(58) Field of Classification Search
USPC .................. 385/3, 9, 14, 15, 31, 130, 132
See application file for complete search history.

(56) References Cited

U.S. PATENT DOCUMENTS

| | | | | |
|---|---|---|---|---|
| 10,156,675 | B1* | 12/2018 | Johnson | H01S 3/06729 |
| 2003/0117691 | A1* | 6/2003 | Bi | H01S 3/0632 |
| | | | | 359/333 |
| 2009/0251766 | A1* | 10/2009 | Furuya | G02B 6/02204 |
| | | | | 359/332 |
| 2018/0233875 | A1* | 8/2018 | Jollivet | H01S 3/094007 |
| 2019/0317380 | A1* | 10/2019 | Nagano | G02F 1/383 |

OTHER PUBLICATIONS

Kee et al., "Narrow linewidth CW and Q-switched erbium-doped fibre loop laser," *Electronics Letters*, 34, 13 (1998) pp. 1318-1319.
Morris et al., "Reactive molten core fabrication of silicon optical fiber," *Optical Materials Express*, 1, 6 (2011) pp. 1141-1149.
Parker et al., "Flash Method of Determining Thermal Diffusivity, Heat, Capacity, and Thermal Conductivity," *Journal of Applied Physics*, 32 (1961) pp. 1679-1684.
Sadowski et al., "Microsecond optical-optical switching in a neodymium-doped two-mode fiber," *Optics Letters*, 18, 11 (1993) pp. 927-929.
Wu et al., "Fast Optical Switching in $Sm^{3+}$-Doped Fibers," *IEEE Photonics Technology Letters*, 8, 2 (1996) pp. 230-232.
Yu et al., "Less than 1% quantum defect fiber lasers via ytterbium-doped multicomponent fluorosilicate optical fiber," *Optics Letters*, 43, 13 (2018) pp. 3096-3099.
Suzuki et al. Highly ytterbium-doped silica fibers with low photodarkening, *Optics Express*, vol. 17, No. 12, (2009) pp. 9924-9932.

* cited by examiner

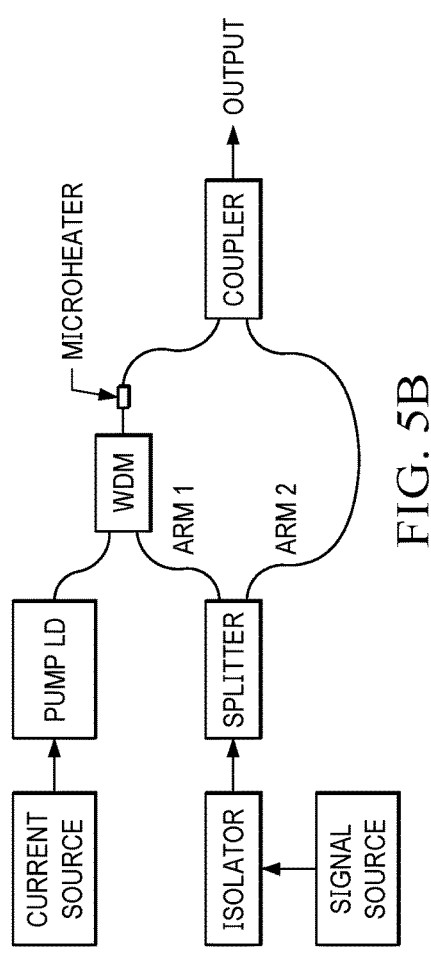
FIG. 5A
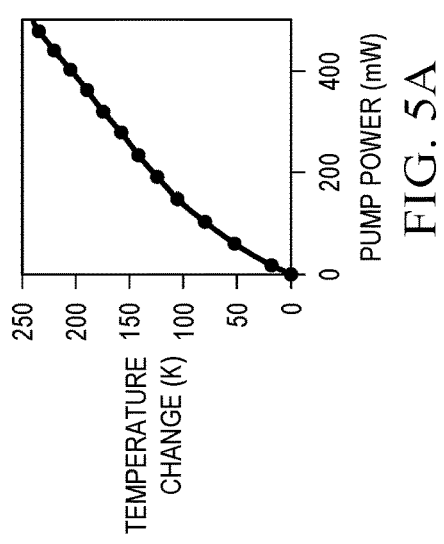
FIG. 5B
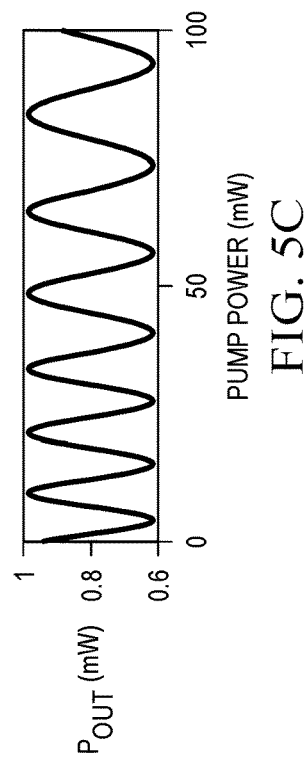
FIG. 5C
FIG. 5D
FIG. 5E

MICROHEATER COMPRISING A RARE EARTH-DOPED OPTICAL FIBER

RELATED APPLICATION

The present patent document claims the benefit of priority to U.S. Provisional Patent Application No. 62/789,608 filed on Jan. 8, 2019, and to U.S. Provisional Patent Application No. 62/773,701 filed on Nov. 30, 2018, both of which are hereby incorporated by reference.

TECHNICAL FIELD

The present disclosure is related generally to optical fiber technology and more particularly to a rare earth-doped optical fiber.

BACKGROUND

Optical telecommunication networks worldwide employ silica-based optical fibers as highly efficient interconnection media. Typically, an optical fiber includes a central core, which transmits and/or amplifies an optical signal, and a cladding surrounding the central core to confine the optical signal within the core. Consequently, the core typically has a refractive index which is greater than the refractive index of the cladding.

Optical fibers may function as passive transmission media for guiding optical signals over long distances. Such passive fibers may be made optically active by doping with rare earth (RE) ions, which have a characteristic emission when pumped by light at suitable wavelengths. Because of this capability, RE-doped fibers have shown great potential for use as active devices, such as optical amplifiers and fiber lasers, in photonic applications at various wavelengths.

For example, RE-doped optical fibers may be used in long-distance optical telecommunications systems to amplify optical signals, such as in widely used erbium-doped fiber amplifiers (EDFAs). Optical amplification in a rare earth-doped fiber occurs by injection of a "pump" signal into the optical fiber which excites the rare earth ions. When an incident signal passes through, the rare earth ions de-excite and produce photons by simulated emission, thereby amplifying the incident signal.

There has been interest in increasing the rare earth concentration in doped optical fibers. A higher rare earth concentration may enable an increase in gain per unit length of the optical fiber such that the length of optical fiber needed for achieving a given amplification may be reduced. On the other hand, if the concentration of rare earth ions in the central core becomes too great, the mean distance between adjacent rare earth ions decreases, increasing the probability of neighboring rare earth ions interacting with one another. The energy delivered to the optical fiber by the pump signal may suffer losses as a result of these energy transfers between neighboring rare earth ions.

Thus, doping optical fibers with excessive amounts of rare earth ions is usually detrimental to optical performance. In addition, conventional fabrication methods are limited in terms of the rare earth dopant concentration that may be achieved.

BRIEF SUMMARY

Described herein is a microheater based on a highly rare earth-doped optical fiber, as well as optical and medical devices that may incorporate such a microheater as a component. Also described is a heating method utilizing the microheater. In addition, methods of making the microheater are discussed.

The microheater includes an optical fiber comprising a rare earth-doped glass core surrounded by a glass cladding. The rare earth-doped glass core comprises a rare earth dopant at a concentration sufficient for luminescence quenching such that, when the rare earth dopant is pumped with light at an absorption band wavelength, at least about 90% of absorbed pump light is converted into heat.

The heating method includes providing a microheater comprising an optical fiber having a rare earth-doped glass core surrounded by a glass cladding, where the rare earth-doped glass core comprises a rare earth dopant. The rare earth dopant is pumped with light at an absorption band wavelength, and at least about 90% of absorbed pump light is converted into heat. A concentration of the rare earth dopant in the rare earth-doped glass core is sufficient to quench luminescence.

The method of making a microheater includes, according to one embodiment, inserting a solid material comprising a rare earth species into a glass tube. The solid material has a melting temperature less than or equal to a drawing temperature of the glass tube. After inserting the solid material, the glass tube is heated to the drawing temperature such that the solid material undergoes melting to form a molten material. The glass tube is drawn to obtain a reduced-diameter glass fiber, and the reduced-diameter glass fiber is cooled. Thus, a microheater comprising an optical fiber having a rare earth-doped glass core surrounded by a glass cladding is formed.

The method of making a microheater includes, according to another embodiment, inserting a solid material comprising a rare earth species into a glass tube. After inserting the solid material, the glass tube is heated to a drawing temperature such that the rare earth species interacts with one or more components of the glass tube, and the glass tube is drawn to obtain a reduced-diameter glass fiber, which is then cooled. Thus, a microheater comprising an optical fiber having a rare earth-doped glass core surrounded by a glass cladding is formed.

BRIEF DESCRIPTION OF THE DRAWINGS

FIG. 5A is a plot showing temperature change as a function of pump power for an exemplary microheater, where the dots are measured data and the line represents a best fit to the data.

FIG. 5B shows an exemplary experimental set-up for the optical modulator.

FIG. 5C shows output power versus launched pump power to the microheater.

FIG. 5D shows output power versus temperature change of the microheater.

FIG. 5E shows input current into the laser diode (top); the output signal with $\cos(\Delta\phi')=-1$ (second from top); the output signal with $\cos(\Delta\phi')=0$ (second from bottom); and the output signal with $\cos(\Delta\phi')=1$ (bottom).

DETAILED DESCRIPTION

It has been discovered that efficient fiber heating may be accomplished through the novel fabrication of a very highly-doped optical fiber. At high rare earth dopant concentrations, the doped fiber may be completely luminescence-quenched such that pumping in the absorption band gives efficient transfer of optical energy to thermal energy while maintaining a low loss at the signal wavelength. The high rare earth dopant concentration also enables the use of very short active fibers (e.g., on the order of millimeters or smaller), giving rise to the possibility of a high-temperature, optically-controlled thermal element for various applications.

Figure 1:
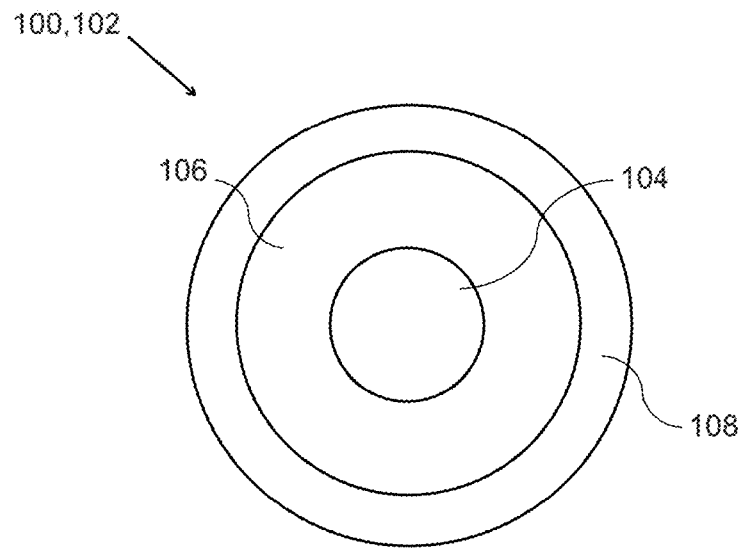
FIG. 1 shows a transverse cross-sectional schematic of an exemplary microheater comprising a rare earth-doped optical fiber.

Referring to FIG. 1, a microheater 100 includes an optical fiber 102 comprising a rare earth-doped glass core 104 surrounded by a glass cladding 106. The rare earth-doped glass core 104 comprises a rare earth dopant at a concentration sufficient for luminescence quenching such that, when the rare earth dopant is pumped with light at an absorption band wavelength, at least about 90% of absorbed pump light is converted into heat. Advantageously, at least about 95% or at least about 99% of the absorbed pump light is converted into heat. The optical fiber 102 may in some cases include a polymeric outer layer 108, such as an acrylate coating, to serve as an abrasion- and moisture-resistant protective layer, as is typically found on conventional optical fibers. However, such an outer layer 108 may not be required or may be removed depending on the temperatures to which the microheater 100 is intended to be heated.

The rare earth dopant in the glass core 104 may comprise a rare earth species such as cerium, dysprosium, erbium, europium, holmium, neodymium, praseodymium, samarium, terbium, thulium, and/or ytterbium. In some examples, the rare earth dopant may take the form of a chemical compound, such as a rare earth oxide, a rare earth fluoride, a rare earth phosphate, a rare earth borate, and/or a rare earth chalcogenide comprising the rare earth species (i.e., a rare earth element or ion). For example, the chemical compound may be $Yb_2O_3$, which comprises $Yb^{3+}$. The concentration of the rare earth dopant at which luminescence quenching is achieved may depend on the rare earth species and on the type of glass (i.e., oxide, fluoride, borate, phosphate, etc). Generally speaking, the concentration of the rare earth dopant in the glass core 104 is at least about 5 wt. % or at least about 10 wt. %. In some cases, the concentration may be at least about 20 wt. % and as high as about 30 wt. %.

The rare earth-doped glass core 104 may include an additional dopant which may assist in generating thermal energy through non-radiative decay. The additional dopant may be OH— or a transition metal and may comprise one or more of chromium, vanadium, titanium, copper, cobalt, iron, manganese, and nickel.

The rare earth-doped glass core 104 may comprise a glass such as a silicate glass, a fluoride glass, a phosphate glass, a borate glass, a germanate glass, a chalcogenide glass, and/or a tellurite glass. The rare earth-doped glass core 104 may further include a crystalline ceramic. In one example, the rare earth-doped glass core may further comprise alumina. Similarly, the glass cladding may comprise a glass such as a silicate glass, a fluoride glass, a phosphate glass, a borate glass, a germanate glass, a chalcogenide glass, and/or a tellurite glass.

The optical fiber 102 may have a fiber diameter in a range from 10 microns to about 2,000 microns. In some examples, the fiber diameter may be in the range from about 100 microns to about 500 microns. The rare earth-doped glass core 104 typically has a core diameter in a range from about 1 micron to about 50 microns.

The optical fiber 102 may have any desired length, such as a length in a range from about 100 microns (μm) to about 2 meters. More typically, the length of the optical fiber lies in the range from about 100 μm to about 10 cm, or from about 100 μm to about 2 mm. Due to the high rare earth concentration of the glass core, relatively small fiber lengths may be sufficient to form the microheater. In addition, the optically-controlled microheater described herein does not require any electrical wires, in contrast to resistive heaters.

Various devices, such as optical modulators, medical instruments, vacuum gauges, and detonators, may be constructed using the microheater as a component.

Figure 2:
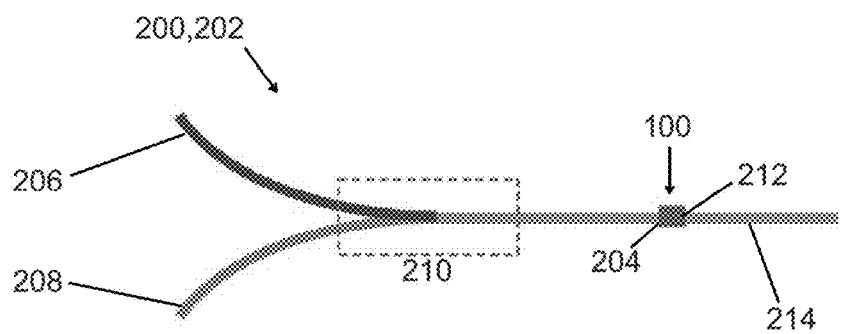
FIG. 2 shows an exemplary phase modulator including a microheater.

For example, an optical modulator may include a microheater according to any embodiment described in this disclosure. Referring to FIG. 2, the optical modulator 200 may comprise a phase modulator 202, wherein an input end 204 of the microheater 100 is in optical communication with a pump input fiber 206, which transmits the pump light, and a signal input fiber 208, which transmits the signal light. More specifically, the input end 204 of the microheater 100 may be spliced to a coupler 210 connected to the pump input fiber 206 and the signal input fiber 208. The coupler 210 may be a conventional wavelength division multiplexer that combines the pump light and the signal light. An output end 212 of the microheater 100 is connected to a signal output fiber 214, which may be a passive fiber. In use, the microheater 100 absorbs the pump light and heats up significantly since it does not luminesce.

The principle behind the use of the microheater as a phase modulator is explained here, where, in this example, the phase shift in one arm of a fiber-based Mach-Zehnder interferometer (MZI) is thermally controlled. Assuming the optical field in the two arms are initially in phase, have the same polarization, and have intensities of $I_1$ and $I_2$, a phase shift of $\Delta\phi'$ in one of the interferometer arms yields $I_{out} \propto [I_1+I_2+2\sqrt{I_1 I_2} \cos \Delta\phi']$ at the modulator output. The phase shift $\Delta\phi'$ can be introduced by heating a segment (length L') of fiber. The phase delay in this heated segment of fiber (the microheater or "heater fiber") is $$\phi' = \frac{2\pi n'_{eff}}{\lambda} L',$$

where λ is the signal wavelength and $n'_{eff}$ is the modal index. Taking the derivative with respect to temperature and neglecting the thermal expansion term (dL'/dT) yields $$\Delta\phi' \approx \frac{2\pi}{\lambda} L' \frac{dn'_{eff}}{dT} \Delta T.$$

A typical value for $$\frac{dn'_{eff}}{dT}$$

(the thermo-optic coefficient or TOC) of lightly-doped silica is ~$10^{-5}$ $K^{-1}$.

Figure 3:
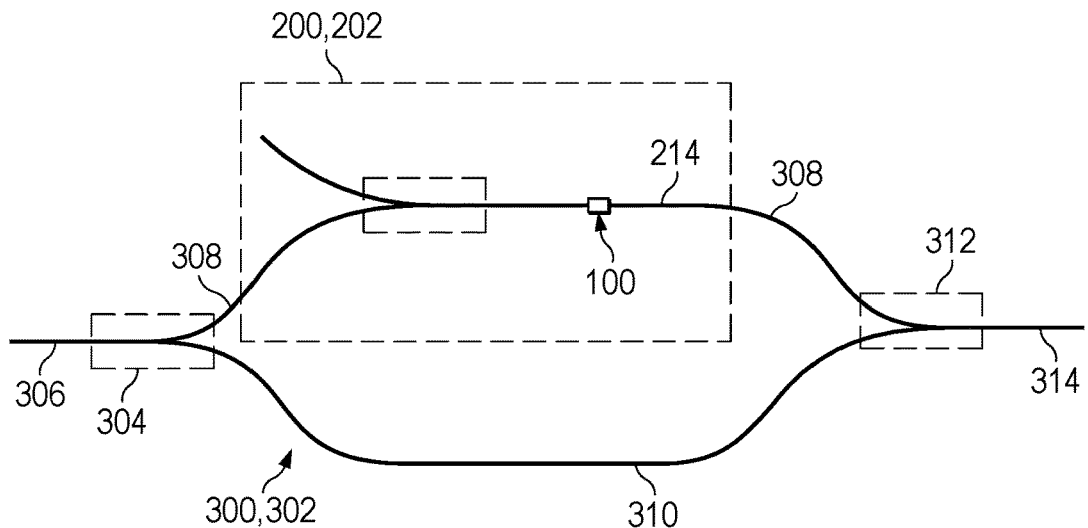
FIG. 3 shows an exemplary intensity modulator including the phase modulator and microheater of FIG. 2.

Referring now to FIG. 3, the optical modulator 300 may be an intensity modulator 302 which utilizes the phase modulator 202 described above as an integral component. In optical communications, intensity modulation (IM) is a form of modulation in which the optical power output of a source is varied in accordance with some characteristic of the modulating signal. The intensity modulator 302 includes an input splitter 304 that divides the signal input fiber 306 into first and second arms 308,310. Referring to FIG. 3, the first arm 308 comprises the phase modulator 202, where phase delay of the signal occurs, and the second arm 310 comprises an optical fiber (e.g., a passive fiber) joined to the first arm 308 (e.g., signal output fiber 214) downstream of the phase modulator 202 by a reverse splitter 312. When the relative phase between the two arms is π, 3π, 5π, or nπ, where n is an odd integer, destructive interference may occur such that there is no signal output through the output fiber 314 connected to the output side of the reverse splitter 312, assuming the splitter 312 is a 50% split. When the relative phase between the two arms is 2π, 4π, 6π, or mπ, where m is an even integer, constructive interference may occur such that the signal output through the output fiber 314 is maximized.

Figure 4A:
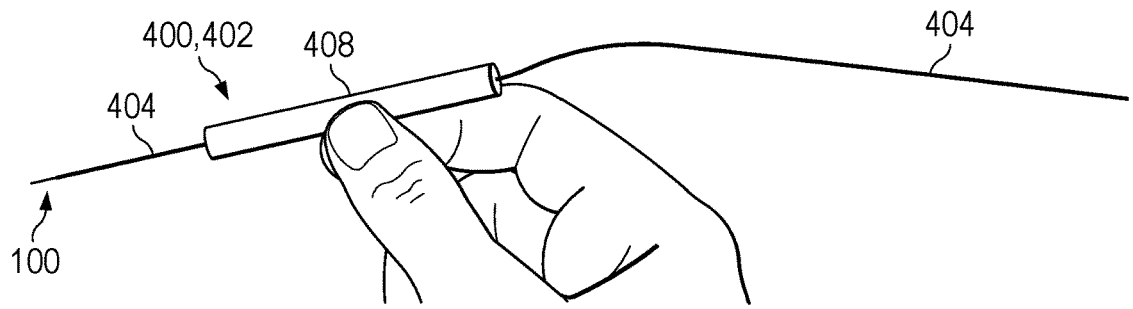
FIGS. 4A and 4B show components of an exemplary medical device comprising a microheater.
Figure 4B:
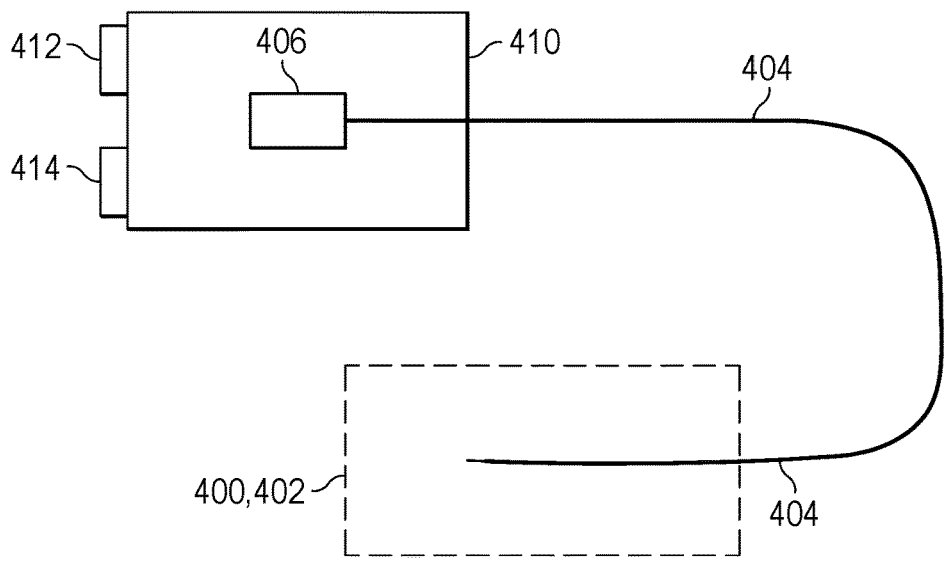

In another application, a medical instrument may include a microheater as described in this disclosure. For example, referring to FIG. 4A, the medical instrument 400 may comprise an insertable heating device 402 including the microheater 100 at a tip thereof for in vivo or ex vivo treatment of a patient. In one example, the microheater 100 may be inserted into a body vessel of a patient. A transport or delivery fiber 404 may be connected to the insertable heating device 402 for transmission of light to the microheater 100 from a pump laser 406 external to the patient, as shown in FIG. 4B. The medical instrument 400 may include a glass tube 408 surrounding the transport fiber 404 to allow for hand-held usage. The transport fiber 404 may be secured to the glass tube 408 by an adhesive, such as epoxy. The pump laser 406 may be supported on a thermal mount 410 and may include an electrical input 412 and temperature control 414.

Also described in this disclosure is a method of heating utilizing the microheater 100. The method includes (a) providing a microheater comprising an optical fiber having a rare earth-doped glass core surrounded by a glass cladding, where the rare earth-doped glass core comprises a rare earth dopant, and (b) pumping the rare earth dopant with light at an absorption band wavelength. More particularly, a concentration of the rare earth dopant in the rare earth-doped glass core is sufficient to quench luminescence, and thus at least about 90% of absorbed pump light is converted into heat. In some examples, at least about 95% or at least about 99% of the absorbed pump light may be converted into heat. As would be recognized by the skilled artisan, an absorption band wavelength is a wavelength within the absorption band of the rare earth dopant, which as explained above comprises a rare earth species (e.g., rare earth ion) that may be optically pumped.

For some applications it may be advantageous to select a peak wavelength of the rare earth dopant as the absorption band wavelength for pumping in order to maximize heating. For other applications, the absorption band wavelength may be an off-peak wavelength to allow for controlled heating. In one example in which the rare earth dopant comprises ytterbium, the absorption band is narrow with a peak wavelength close to 975 nm. The light employed for pumping may be generated by a laser. It has been shown that the microheater may be heated to nearly 500° F. using just over 700 mW of optical power. In addition, the heating may occur rapidly in an estimated range from about 0.1 K/ms to about 100 K/μs, depending on various factors. Advantageously, the heating method may be carried out without electrical wires attached to (or without electrical current passing through) the microheater.

The optical fiber employed in the heating method described above may have any of the characteristics set forth above or elsewhere in this disclosure.

A method of making the microheater is now described. The method includes, according to a first embodiment, inserting a solid material comprising a rare earth species into a glass tube, where the solid material has a melting temperature less than or equal to a drawing temperature of the glass tube. After inserting the solid material, the glass tube is heated to the drawing temperature such that the solid material undergoes melting to form a molten material. As would be recognized by one of ordinary skill in the art, the drawing temperature of the glass tube is a temperature at or above the glass transition temperature of the glass tube. If the glass tube comprises more than one glass, then the drawing temperature may be selected to be above each of the glass transition temperatures. Typical drawing temperatures may be in a range from about 1800° C. to 2200° C. for a silicate glass, in one example. While at the drawing temperature, the glass tube is drawn to obtain a reduced-diameter glass fiber, and then the reduced-diameter glass fiber is cooled. Thus, a microheater comprising an optical fiber having a rare earth-doped glass core surrounded by a glass cladding is formed. This microheater fabrication approach may be referred to as the reactive molten core approach.

The rare earth-doped glass core of the optical fiber produced as described above includes a rare earth dopant at a concentration sufficient for luminescence quenching such that, when the rare earth dopant is pumped with light at an absorption band wavelength, at least about 90% of absorbed pump light is converted into heat. In some examples, at least about 95% or at least about 99% of the absorbed pump light may be converted into heat. Also, the rare earth-doped glass core may include an additional dopant comprising OH— or a transition metal to facilitate thermal energy generation through non-radiative decay.

The solid material inserted into the glass tube may comprise a metal powder, wire or rod. The rare earth species may be cerium, dysprosium, erbium, europium, holmium, neodymium, praseodymium, samarium, terbium, thulium, and/or ytterbium. In one example, the rare earth species is ytterbium and the solid material comprises a ytterbium metal wire or rod. The rare earth species may oxidize during the heating and/or drawing. Also or alternatively, one or more components of the glass tube may interact with the molten material during the heating and/or drawing. The glass cladding formed in the drawing process may comprise a glass such as a silicate glass, a fluoride glass, a phosphate glass, a borate glass, a germanate glass, a chalcogenide glass, and/or a tellurite glass. The method may be carried out in air.

The method of making a microheater comprises, according to a second embodiment, inserting a solid material comprising a rare earth species into a glass tube, and, after inserting the solid material, heating the glass tube to a drawing temperature such that the rare earth species interacts with one or more components of the glass tube. As set forth above, the drawing temperature of the glass tube is a temperature at or above the glass transition temperature of the glass tube. If the glass tube comprises more than one glass, then the drawing temperature may be selected to be above each of the glass transition temperatures. Typical drawing temperatures may be in a range from about 1800° C. to 2200° C. for a silicate glass, in one example. While at the drawing temperature, the glass tube is drawn to obtain a reduced-diameter glass fiber, and the reduced-diameter glass fiber is cooled. Thus, a microheater comprising an optical fiber having a rare earth-doped glass core surrounded by a glass cladding is formed.

The rare earth-doped glass core of the optical fiber produced as described above includes a rare earth dopant at a concentration sufficient for luminescence quenching such that, when the rare earth dopant is pumped with light at an absorption band wavelength, at least about 90% of absorbed pump light is converted into heat. In some examples, at least about 95% or at least about 99% of the absorbed pump light may be converted into heat. Also, the rare earth-doped glass core may include an additional dopant comprising OH— or a transition metal to facilitate thermal energy generation through non-radiative decay.

The solid material may comprise a powder, wire or rod. The rare earth species may comprise cerium, dysprosium, erbium, europium, holmium, neodymium, praseodymium, samarium, terbium, thulium, and/or ytterbium. One or more components of the glass tube may interact with the rare earth species during the heating and/or drawing. The solid material comprising the rare earth species may have a melting temperature lower than the drawing temperature of the glass tube, and the solid material may undergo melting during the heating of the glass tube to the drawing temperature. In some cases, the solid material may oxidize during the heating and/or drawing.

The rare earth species may be a rare earth element or ion such as ytterbium and the solid material may comprise a rare earth metal wire or rod or a rare earth oxide powder. The glass cladding formed in the drawing process may comprise a glass such as a silicate glass, a fluoride glass, a phosphate glass, a borate glass, a germanate glass, a chalcogenide glass, and/or a tellurite glass. The method may be carried out in air.

The method (first and/or second embodiment) may further include, prior to or during the drawing process, surrounding the glass tube with one or more additional layers, such as a ceramic tube (e.g., an alumina tube) and/or a polymeric coating that yields a protective polymeric outer layer on the optical fiber upon drawing. During drawing, the ceramic tube may react or melt such that the resulting glass core is an all-glass core or a glass-ceramic core that includes both the glass and a ceramic, such as alumina. Also, as mentioned above, the protective polymeric outer layer may not be required or may be removed, depending on the heating temperatures of the microheater.

EXAMPLES

Microheater Fabrication

The microheater of this example is fabricated using the reactive molten core approach described above. In this particular experiment, a 1 mm diameter ytterbium wire (99.9% purity, Sigma-Aldrich) is placed inside a pure sapphire (alumina; $Al_2O_3$) sleeve (Saint-Gobain), which measures 1.1 mm in inner diameter and 1.5 mm in outer diameter. This Yb wire-$Al_2O_3$ assembly is inserted into a pure silica capillary tube (Heraeus Tenevo Inc., Buford, GA) with a 3 mm inner diameter and a 30 mm outer diameter, which serves as the fiber cladding upon drawing. The tube is drawn at a temperature of about 2050° C. and to a cladding diameter of 110 µm. A conventional single UV-curable acrylate coating is also applied during the drawing process and yields a drawn optical fiber diameter of 250 µm. The usage of pure Yb wire significantly increases the Yb concentration in the fiber in comparison to other Yb-doped fibers used for lasers, leading to an optical fiber that forms the basis for a very efficient high-temperature thermal element, or microheater.

Characterization

A measurement of temperature change versus pump power for a 2.4 mm segment of the above-described fiber (spliced between two passive fiber pigtails) is shown in FIG. 5A. Considering a phase shift of $\Delta\phi'=\pi$, the required $\Delta T$ is 32.3 K corresponding to only ~31 mW of pump power. The high rare earth doping level offers a significant temperature change in a short segment of fiber and thus affords a small thermal volume, which may render a short response time and a high modulation speed.

Figure 6:
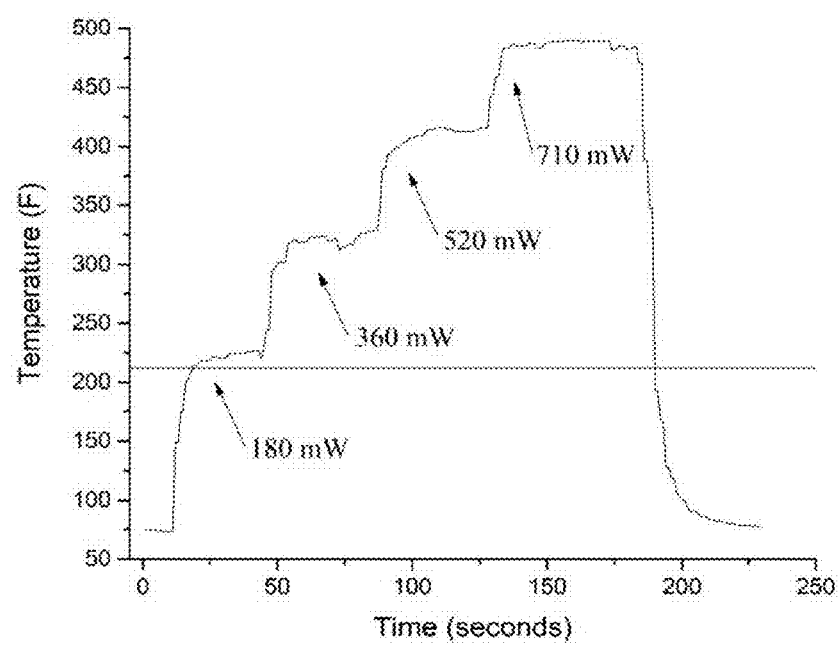
FIG. 6 plots temperature at the tip of the microheater as a function of laser power in milliwatts (mW) and time.

FIG. 6 shows preliminary results on the temperature at the tip of the microheater as a function of laser power in milliwatts (mW), which is arbitrarily changed with time to show the speed with which the microheater can be controlled. The microheater can be heated up to a temperature of at least about 450° F. with a pump power of less than 700 mW.

Optical Modulator Results

An exemplary experimental set-up for an optical modulator is shown in FIG. 5B. A Mach-Zehnder-based modulator is constructed using a 75:25 splitter and a 50:50 coupler (reverse splitter). An input signal at 1550 nm is generated by a narrow-linewidth tunable laser source and an isolator is placed afterward to avoid feedback destabilizing the source laser. In arm 1, a WDM is introduced to combine the 1550 nm signal and the 976 nm pump diode laser signal. A 2.4 mm segment of an uncoated microheater was spliced after the WDM, which can absorb the 976 nm pump signal while passing the 1550 nm input signal with only 0.4 dB loss per splice. To roughly balance the MZI, 1.65 m of passive fiber is used to extend the length of arm 2. Finally, after the 50:50 coupler, the output signal is collected for different measurements as discussed below.

First, a DC current is supplied to the pump and a measurement of output power ($P_{out}$) vs 976 nm laser diode pump power is performed using an optical power meter, and the result is shown in FIG. 5C. Using FIG. 5A to transfer pump power into temperature change yielded the result shown in FIG. 5D. The results directly show the intensity modulation introduced by the microheater. The average temperature difference between neighboring peaks in FIG. 5D (corresponding to $\Delta\phi'=2\pi$) is 11.74 K. This, according to the equation for $\Delta\phi'$ above, should theoretically be 64.6 K. This result indicates that the neighboring passive fiber near the microheater is also heating, corresponding to a longer L' and therefore a smaller $\Delta T$. While this seems to be a good result since a π phase shift could be achieved with a small pump power, this may negatively impact the modulation speed of the system.

To determine the modulation speed, a pulsed current (pulse width 5 ms, pulse repetition interval 6.5 ms) is supplied to the pump, as shown in FIG. 5E (top). The long pulses are used in order to observe both slow and fast responses of the MZI. The results for the output signal with three different pump powers are shown in FIG. 5E (second from top, second from bottom, and bottom), which correspond to $\cos(\Delta\phi')=-1,0$, and 1, respectively. Both fast and slow temporal components are observed in the signal, with the latter having a characteristic time of 350 μs, rendering ~2.86 kHz modulation speed. This is limited by the slow thermal diffusion from the core to the much more voluminous (~121×) cladding, and also by the heating of neighboring passive fibers which may further increase the thermal volume. Using the Flash Method known in the art to determine the thermal diffusivity, heat capacity and thermal conductivity of the fiber and further determine the time it takes for thermal diffusion from core to cladding to reach equilibrium, the result is ~540 μs, which is close to the measured value (350 μs). Therefore, etching some of the microheater cladding may help to increase the modulation speed to the MHz range.

The subject-matter of the disclosure may also relate, among others, to the following aspects:

A first aspect relates to a microheater comprising: an optical fiber comprising a rare earth-doped glass core surrounded by a glass cladding, the rare earth-doped glass core comprising a rare earth dopant at a concentration sufficient for luminescence quenching such that, when the rare earth dopant is pumped with light at an absorption band wavelength, at least about 90% of absorbed pump light is converted into heat.

A second aspect relates to the microheater of the first aspect, wherein the rare earth dopant comprises a rare earth species selected from the group consisting of: cerium, dysprosium, erbium, europium, holmium, neodymium, praseodymium, samarium, terbium, thulium, and ytterbium.

A third aspect relates to the microheater of the first or second aspect, wherein the rare earth dopant comprises a compound comprising the rare earth species.

A fourth aspect relates to the microheater of the third aspect, wherein the compound is selected from the group consisting of: a rare earth oxide, a rare earth fluoride, a rare earth phosphate, a rare earth borate, and a rare earth chalcogenide.

A fifth aspect relates to the microheater of the fourth aspect, wherein the compound comprises $Yb_2O_3$.

A sixth aspect relates to the microheater of any one of the first through fifth aspects, wherein the concentration of the rare earth dopant is at least about 5 wt. %.

A seventh aspect relates to the microheater of the sixth aspect, wherein the concentration of the rare earth dopant is at least about 20 wt. %.

An eighth aspect relates to the microheater of any one of the first through seventh aspects, wherein at least about 95% or at least about 99% of the absorbed pump light is converted into heat.

A ninth aspect relates to the microheater of any one of the first through eighth aspects, wherein the rare earth-doped glass core comprises a glass selected from the group consisting of: a silicate glass, a fluoride glass, a phosphate glass, a borate glass, a germanate glass, a chalcogenide glass, and a tellurite glass.

A tenth aspect relates to the microheater of the ninth aspect, wherein the rare earth-doped glass core further comprises a crystalline ceramic, and/or wherein the rare earth-doped glass core further comprises an additional dopant comprising OH— or a transition metal to facilitate thermal energy generation through non-radiative decay.

An eleventh aspect relates to the microheater of the ninth or tenth aspect, wherein the rare earth-doped glass core further comprises alumina.

A twelfth aspect relates to the microheater of any one of the first through the eleventh aspects, wherein the glass cladding comprises a glass selected from the group consisting of a silicate glass, a fluoride glass, a phosphate glass, a borate glass, a germanate glass, a chalcogenide glass, and a tellurite glass.

A thirteenth aspect relates to the microheater of any one of the first through twelfth aspects, wherein the optical fiber has a fiber diameter in a range from 10 microns to about 2,000 microns.

A fourteenth aspect relates to the microheater of the thirteenth aspect, wherein the fiber diameter is in the range from about 100 microns to about 500 microns.

A fifteenth aspect relates to the microheater of any one of the first through the fourteenth aspects, wherein the rare earth-doped glass core has a core diameter in a range from about 1 micron to about 50 microns.

A sixteenth aspect relates to the microheater of any one of the first through the fifteenth aspects, wherein the optical fiber has a length in a range from about 100 microns to about 2 m or from about 100 microns to about 10 cm.

A seventeenth aspect relates to the microheater of the sixteenth aspect, wherein the length is from about 100 microns to about 2 mm.

An eighteenth aspect relates to the microheater of any one of the first through the seventeenth aspects not comprising any electrical wires.

A nineteenth aspect relates to an optical modulator comprising the microheater of any one of the first through the eighteenth aspects.

A twentieth aspect relates to the optical modulator of the nineteenth aspect comprising a phase modulator, wherein an input end of the microheater is connected to a pump input fiber and a signal input fiber by a coupler, and wherein an output end of the microheater is connected to a signal output fiber.

A twenty-first aspect relates to the optical modulator of the twentieth aspect comprising an input splitter dividing the signal input fiber into first and second arms, the first arm including the phase modulator and a second arm comprising an optical fiber joined to the first arm downstream of the phase modulator by a reverse splitter, the optical modulator being an intensity modulator.

A twenty-second aspect relates to a medical instrument comprising the microheater of any one of the first through the eighteenth aspects for ex vivo or in vivo heating.

A twenty-third aspect relates to the medical instrument of the twenty-second aspect comprising: an insertable heating device including the microheater at a tip thereof for use with a patient; and a transport fiber connected to the insertable heating device for transmission of light to the microheater from a pump laser external to the patient.

A twenty-fourth aspect relates to a method of heating comprising: providing a microheater comprising an optical fiber having a rare earth-doped glass core surrounded by a glass cladding, the rare earth-doped glass core comprising a rare earth dopant; pumping the rare earth dopant with light at an absorption band wavelength, wherein at least about 90% of absorbed pump light is converted into heat, a concentration of the rare earth dopant in the rare earth-doped glass core being sufficient to quench luminescence.

A twenty-fifth aspect relates to the method of the twenty-fourth aspect wherein at least about 95% of the absorbed pump light is converted into heat.

A twenty-sixth aspect relates to the method of the twenty-fourth or twenty-fifth aspect, wherein the absorption band wavelength selected for pumping is a peak wavelength to maximize heating.

A twenty-seventh aspect relates to the method of any one of the twenty-fourth through the twenty-sixth aspects, wherein the absorption band wavelength selected for pumping is an off-peak wavelength to allow for controlled heating.

A twenty-eighth aspect relates to the method of any one of the twenty-fourth through the twenty-seventh aspects, wherein the microheater heats up to a temperature of at least about 450° F. with a pump power of less than 700 mW.

A twenty-ninth aspect relates to the method of any one of the twenty-fourth through the twenty-eighth aspects, wherein the rare earth dopant comprises a rare earth species selected from the group consisting of: cerium, dysprosium, erbium, europium, holmium, neodymium, praseodymium, samarium, terbium, thulium, and ytterbium.

A thirtieth aspect relates to the method of any one of the twenty-fourth through the twenty-ninth aspects, wherein the rare earth dopant comprises a compound selected from the group consisting of: a rare earth oxide, a rare earth fluoride, a rare earth phosphate, a rare earth borate, and a rare earth chalcogenide.

A thirty-first aspect relates to the method of the thirtieth aspect, wherein the compound comprises $Yb_2O_3$.

A thirty-second aspect relates to the method of any one of the twenty-fourth through the thirty-first aspects, wherein the concentration of the rare earth dopant is at least about 10 wt. %.

A thirty-third aspect relates to the method of the thirty-second aspect, wherein the concentration of the rare earth dopant is at least about 20 wt. %.

A thirty-fourth aspect relates to the method of any one of the twenty-fourth through the thirty-third aspects, wherein the rare earth-doped glass core comprises a glass selected from the group consisting of: a silicate glass, a fluoride glass, a phosphate glass, a borate glass, a germanate glass, a chalcogenide glass, and a tellurite glass.

A thirty-fifth aspect relates to the method of the thirty-fourth aspect wherein the rare earth-doped glass core further comprises a crystalline ceramic, and/or wherein the rare earth-doped glass core further comprises an additional dopant comprising OH— or a transition metal to facilitate thermal energy generation through non-radiative decay.

A thirty-sixth aspect relates to the method of the thirty-fourth or thirty-fifth aspect, wherein the rare earth-doped glass core further comprises alumina.

A thirty-seventh aspect relates to the method of any one of the twenty-fourth through the thirty-sixth aspects, wherein the glass cladding comprises a glass selected from the group consisting of: a silicate glass, a fluoride glass, a phosphate glass, a borate glass, a germanate glass, a chalcogenide glass, and a tellurite glass.

A thirty-eighth aspect relates to the method of any one of the twenty-fourth through the thirty-seventh aspects, wherein the optical fiber has a fiber diameter in a range from 10 microns to about 2,000 microns.

A thirty-ninth aspect relates to the method of the thirty-eighth aspect, wherein the fiber diameter is in the range from about 100 microns to about 500 microns.

A fortieth aspect relates to the method of any one of the twenty-fourth through the thirty-ninth aspects, wherein the rare earth-doped glass core has a core diameter in a range from about 1 micron to about 50 microns.

A forty-first aspect relates to the method of any one of the twenty-fourth through the fortieth aspects, wherein the optical fiber has a length in a range from about 100 microns to about 2 m, from about 100 microns to about 10 cm, or from about 100 microns to about 2 mm.

A forty-second aspect relates to the method of any one of the twenty-fourth through the forty-first aspects, wherein the microheater does not comprise any electrical wires.

A forty-third aspect relates to a method of making a microheater, the method comprising: inserting a solid material comprising a rare earth species into a glass tube, the solid material having a melting temperature less than or equal to a drawing temperature of the glass tube; after inserting the solid material, heating the glass tube to the drawing temperature such that the solid material undergoes melting to form a molten material; drawing the glass tube to obtain a reduced-diameter glass fiber; and cooling the reduced-diameter glass fiber, thereby forming a microheater comprising an optical fiber having a rare earth-doped glass core surrounded by a glass cladding.

A forty-fourth aspect relates to the method of the forty-third aspect, wherein the rare earth-doped glass core includes a rare earth dopant at a concentration sufficient for luminescence quenching such that, when the rare earth dopant is pumped with light at an absorption band wavelength, at least about 90% of absorbed pump light is converted into heat.

A forty-fifth aspect relates to the method of the forty-third or the forty-fourth aspect, wherein the solid material comprises a metal powder, wire or rod.

A forty-sixth aspect relates to the method of any one of the forty-third through the forty-fifth aspects, wherein the rare earth species is selected from the group consisting of: cerium, dysprosium, erbium, europium, gadolinium, holmium, neodymium, praseodymium, samarium, terbium, thulium, and ytterbium.

A forty-seventh aspect relates to the method of any one of the forty-third through the forty-sixth aspects, wherein the rare earth species oxidizes during the heating and/or drawing.

A forty-eighth aspect relates to the method of any one of the forty-third through the forty-seventh aspects, wherein one or more components of the glass tube interact with the molten material during the heating and/or drawing.

A forty-ninth aspect relates to the method of any one of the forty-third through the forty-eighth aspects, wherein the rare earth species is ytterbium and the solid material comprises a ytterbium metal wire or rod.

A fiftieth aspect relates to the method of any one of the forty-third through the forty-ninth aspects, wherein the glass cladding comprises a glass selected from the group consisting of: selected from the group consisting of a silicate glass, a fluoride glass, a phosphate glass, a borate glass, a germanate glass, a chalcogenide glass, and a tellurite glass.

A fifty-first aspect relates to the method of any one of the forty-third through the fiftieth aspects being carried out in air.

A fifty-second aspect relates to method of making a microheater, the method comprising: inserting a solid material comprising a rare earth species into a glass tube; after inserting the solid material, heating the glass tube to a drawing temperature such that the rare earth species interacts with one or more components of the glass tube; drawing the glass tube to obtain a reduced-diameter glass fiber; and cooling the reduced-diameter glass fiber, thereby forming a microheater comprising an optical fiber having a rare earth-doped glass core surrounded by a glass cladding.

A fifty-third aspect relates to the method of the fifty-second aspect, wherein the rare earth-doped glass core includes a rare earth dopant at a concentration sufficient for luminescence quenching such that, when the rare earth dopant is pumped with light at an absorption band wavelength, at least about 90% of absorbed pump light is converted into heat.

A fifty-fourth aspect relates to the method of the fifty-second or the fifty-third aspect, wherein the solid material comprises a powder, wire or rod.

A fifty-fifth aspect relates to the method of any one of the fifty-second through the fifty-fourth aspects, wherein the rare earth species is selected from the group consisting of: cerium, dysprosium, erbium, europium, holmium, neodymium, praseodymium, samarium, terbium, thulium, and ytterbium.

A fifty-sixth aspect relates to the method of any one of the fifty-second through the fifty-fifth aspects, wherein the solid material has a melting temperature lower than or equal to the drawing temperature of the glass tube, and wherein the solid material undergoes melting during the heating of the glass tube to the drawing temperature.

A fifty-seventh aspect relates to the method of any one of the fifty-second through the fifty-sixth aspects, wherein the solid material oxidizes during the heating and/or drawing.

A fifty-eighth aspect relates to the method of any one of the fifty-second through the fifty-seventh aspects, wherein the rare earth element is ytterbium and the solid material comprises a ytterbium metal wire or rod or a ytterbium oxide powder.

A fifty-ninth aspect relates to the method of any one of the fifty-second through the fifty-eighth aspects, wherein the glass cladding comprises a glass selected from the group consisting of: a silicate glass, a fluoride glass, a phosphate glass, a borate glass, a germanate glass, a chalcogenide glass, and a tellurite glass.

A sixtieth aspect relates to the method of any one of the fifty-second through the fifty-ninth aspects being carried out in air.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A microheater comprising:
an optical fiber comprising a rare earth-doped glass core radially surrounded by a glass cladding, the rare earth-doped glass core comprising a rare earth dopant at a concentration sufficient for luminescence quenching such that, when the rare earth dopant is pumped with light transmitted through an input end of the optical fiber at an absorption band wavelength, at least 95% of absorbed pump light is converted into heat,
wherein the concentration of the rare earth dopant is at least 10 wt. %.

2. The microheater of claim 1, wherein the rare earth dopant comprises a rare earth species selected from the group consisting of: cerium, dysprosium, erbium, europium, holmium, neodymium, praseodymium, samarium, terbium, thulium, and ytterbium.

3. The microheater of claim 2, wherein the rare earth dopant comprises a compound comprising the rare earth species, the compound being selected from the group consisting of: a rare earth oxide, a rare earth fluoride, a rare earth phosphate, a rare earth borate, and a rare earth chalcogenide.

4. The microheater of claim 1, wherein the concentration of the rare earth dopant is as high as 30 wt. %.

5. The microheater of claim 1, wherein the rare earth-doped glass core further comprises an additional dopant comprising OH— or a transition metal to facilitate thermal energy generation through non-radiative decay.

6. The microheater of claim 1, wherein the rare earth-doped glass core and the glass cladding comprise a glass selected from the group consisting of: a silicate glass, a fluoride glass, a borate glass, a germanate glass, a chalcogenide glass, and a tellurite glass.

7. The microheater of claim 1, wherein the optical fiber has a fiber diameter in a range from 10 microns to 2,000 microns, and
wherein the rare earth-doped glass core has a core diameter in a range from 1 micron to 50 microns.

8. The microheater of claim 1 not comprising any electrical wires.

9. A medical instrument comprising the microheater of claim 1 for ex vivo or in vivo heating.

10. The medical instrument of claim 9 comprising:
an insertable heating device including the microheater at a tip thereof for use with a patient; and
a transport fiber connected to the insertable heating device for transmission of light to the microheater from a pump laser external to the patient.

11. An optical modulator comprising:
a microheater comprising:
an optical fiber comprising a rare earth-doped glass core radially surrounded by a glass cladding, the rare earth-doped glass core comprising a rare earth dopant at a concentration sufficient for luminescence quenching such that, when the rare earth dopant is pumped with light at an absorption band wavelength, at least about 90% of absorbed pump light is converted into heat.

12. The optical modulator of claim 11 comprising a phase modulator, wherein an input end of the microheater is connected to a pump input fiber and a signal input fiber by a coupler, and wherein an output end of the microheater is connected to a signal output fiber.

13. The optical modulator of claim 12 comprising an input splitter dividing the signal input fiber into first and second arms, the first arm including the phase modulator and a second arm comprising an optical fiber joined to the first arm downstream of the phase modulator by a reverse splitter, the optical modulator being an intensity modulator.

14. The microheater of claim 1, wherein, when the rare earth dopant is pumped with light transmitted through an input end of the optical fiber at an absorption band wavelength, at least 99% of the absorbed pump light is converted into heat.

15. The microheater of claim 1, wherein the rare earth doped glass core comprises a glass consisting of a silicate glass.

16. The microheater of claim 1, wherein the concentration of the rare earth dopant is at least 20 wt. %.

17. The microheater of claim 1, wherein the optical fiber is fabricated by a molten core method.

18. The microheater of claim 1, wherein the rare earth doped glass core comprises a glass consisting of a silicate glass, and
wherein the concentration of the rare earth dopant is at least 20 wt. %.

* * * * *